United States Patent
Uchino

(10) Patent No.: US 11,396,939 B2
(45) Date of Patent: Jul. 26, 2022

(54) OUTPUT SHAFT SUPPORT STRUCTURE

(71) Applicant: HONDA MOTOR CO., LTD., Tokyo (JP)

(72) Inventor: Satoshi Uchino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 190 days.

(21) Appl. No.: 16/804,840

(22) Filed: Feb. 28, 2020

(65) Prior Publication Data

US 2020/0278019 A1    Sep. 3, 2020

(30) Foreign Application Priority Data

Mar. 1, 2019  (JP) .............................. JP2019-037502

(51) Int. Cl.
*F16H 57/00* (2012.01)
*F16H 57/023* (2012.01)

(52) U.S. Cl.
CPC ....... *F16H 57/0025* (2013.01); *F16H 57/023* (2013.01)

(58) Field of Classification Search
CPC .. F16H 57/0025; F16H 57/023; F16H 37/022; F16H 57/035; F16H 2057/0062; F16H 2057/02047; F16H 57/022; F16H 2057/0227; F16H 9/18; F16H 57/021; F16H 57/037; F16H 2057/02043; B23P 19/00; B23P 21/00
See application file for complete search history.

(56) References Cited

U.S. PATENT DOCUMENTS

| 9,333,843 B2 | 5/2016 | Suzuki et al. | |
| 2018/0015815 A1* | 1/2018 | Makino | F16H 57/021 |
| 2018/0087629 A1 | 3/2018 | Miyajima | |
| 2019/0093750 A1* | 3/2019 | Matsuto | F16H 25/2204 |
| 2020/0103017 A1* | 4/2020 | Lawson | F16H 57/025 |

FOREIGN PATENT DOCUMENTS

| JP | 2011-214631 A | 10/2011 |
| JP | 5685113 B2 | 3/2015 |
| JP | 2016-075298 A | 5/2016 |
| WO | 2016/163320 A1 | 10/2016 |

OTHER PUBLICATIONS

Office Action dated Feb. 2, 2021 issued over the corresponding Japanese Patent Application No. 2019-037502 with the English translation thereof.

* cited by examiner

*Primary Examiner* — Rick K Chang
(74) *Attorney, Agent, or Firm* — Carrier Blackman & Associates, P.C.; Joseph P. Carrier; William D. Blackman

(57) ABSTRACT

An output shaft support structure includes: an output shaft; and a supporting body that supports the output shaft, the output shaft including: a rotating shaft; a first rolling bearing fixed to one end section of the rotating shaft; a second rolling bearing fixed to the other end section of the rotating shaft; and a secondary reduction driven gear including a boss section fixed to the rotating shaft. For a predetermined period, the boss section of the secondary reduction driven gear contacts the second rolling bearing, and a lower end of the rotating shaft is always separated from the supporting body.

4 Claims, 8 Drawing Sheets

FIG. 6

[TABLE 1]

| | GENERATED STRESS (MPa) | | | |
|---|---|---|---|---|
| | TENSILE | COMPRESSIVE | AVERAGE STRESS | STRESS AMPLITUDE |
| WORKING EXAMPLE 1 | -218 | -165 | -26.5 | -191.5 |
| WORKING EXAMPLE 2 | | | | |

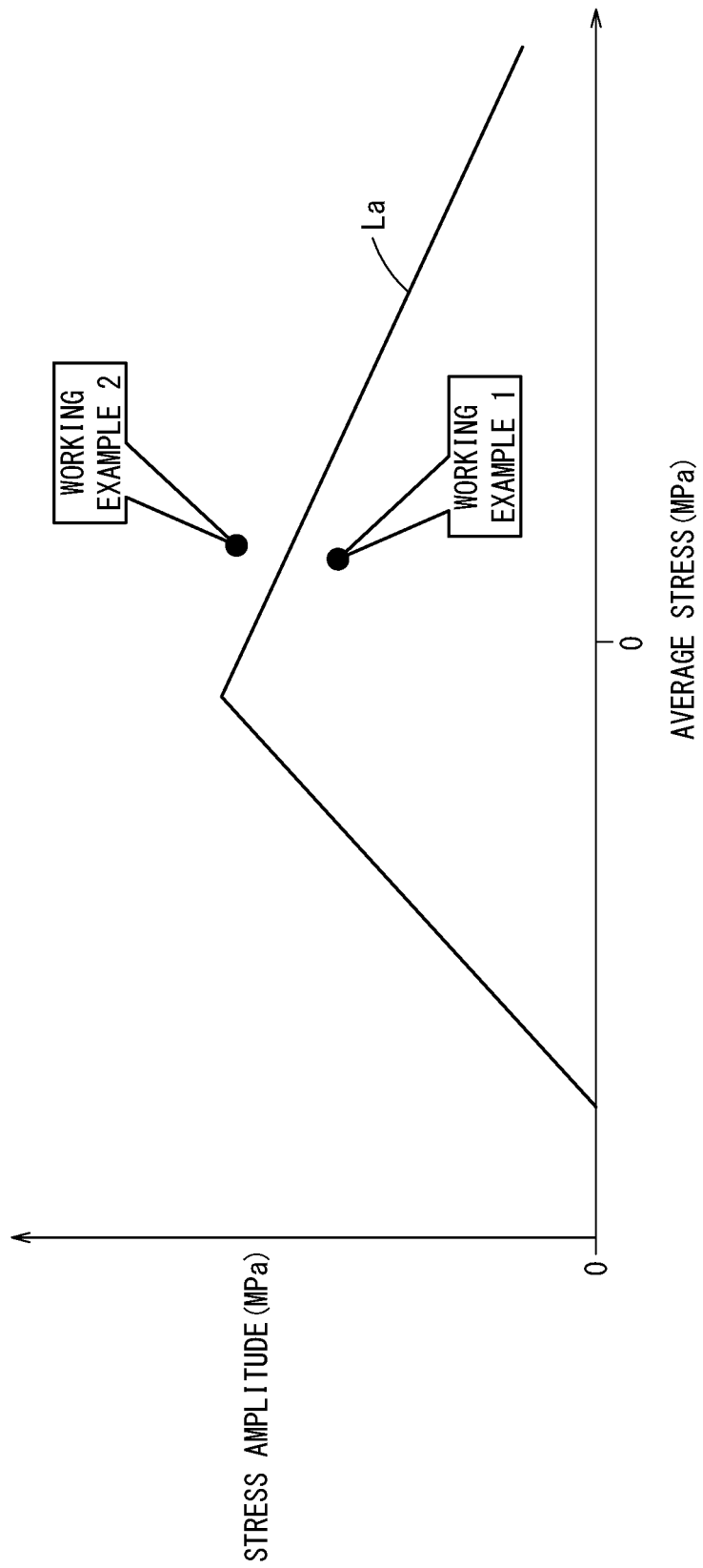

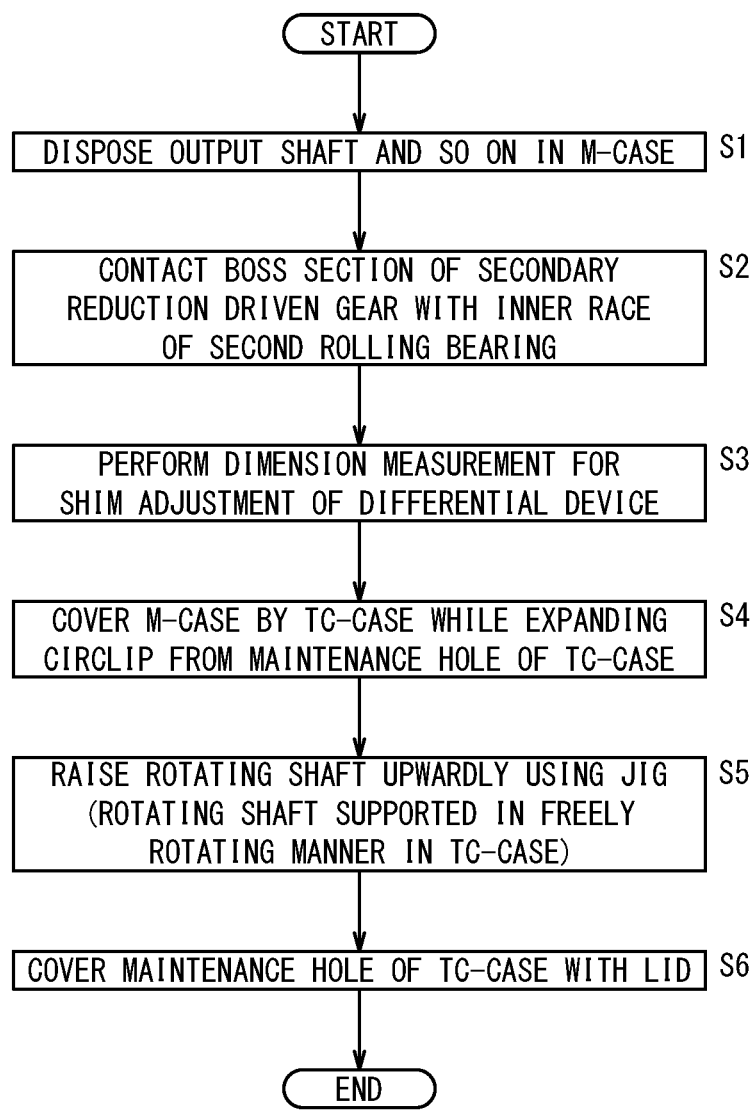

OUTPUT SHAFT SUPPORT STRUCTURE

CROSS-REFERENCE TO RELATED APPLICATION

This application is based upon and claims the benefit of priority from Japanese Patent Application No. 2019-037502 filed on Mar. 1, 2019, the contents of which are incorporated herein by reference.

BACKGROUND OF THE INVENTION

Field of the Invention

The present invention relates to a support structure of an output shaft disposed in a vehicle, for example, and transmitting, to a wheel, a driving force from a previous stage, and relates also to an assembly method of the output shaft.

Description of the Related Art

International Publication No. 2016/163320 addresses a problem of providing a continuously variable transmission that while being able to maintain strength of a pulley half body, can achieve weight-lightening of the pulley half body.
In order to solve the above problem, in International Publication No. 2016/163320, in a continuously variable transmission having a primary pulley that includes a gripping groove wrapped around by a V-belt, a fixed-side pulley half body has a hollow section formed on its back surface side being an opposite side to the gripping groove, includes a cavity for disposing a drive shaft in its center, and includes a reinforcing member formed in a conical ring shape representing a cone from its outer circumferential side to its inner circumferential side. The reinforcing member has its outer circumferential side end section attached abutting on an outer circumferential side end surface of the hollow section, and has its inner circumferential side end section attached to an inner circumferential side end surface of the hollow section via a holding member of wedge-shaped cross section.

SUMMARY OF THE INVENTION

Incidentally, it is conceivable that, in order to reduce friction of the continuously variable transmission, a shaft support structure of a final output shaft (a counter shaft) is changed from a taper roller bearing to a support by ball and roller. However, a thrust position of the counter shaft has not been determined until a TC-case is assembled in an M-case, and there has been a need for a rotating shaft to be contacted with somewhere to prevent fall of the rotating shaft. Accordingly, it is conceivable for a lower end of the rotating shaft to be abutted on a supporting body (for example, an inner wall of the M-case, or the like) to control fall of the rotating shaft. In a mass production process, there sometimes occurs a need for variable transmissions of different specifications to be assembled in the same facility. That is, sometimes, specifications requiring shim adjustment in a support bearing of the rotating shaft are mixed in the same facility. In the shim adjustment, in order to stabilize a measurement dimension, the rotating shaft, along with a differential device, is rotated in a state of having been applied with a thrust load. Hence, if hardness of a contact portion between the rotating shaft and the supporting body is low, it is easy for damage to occur, and there is concern about occurrence of contamination, and so on.

In order to dispel the above-mentioned concern, consideration has been given to having a projection for abutting of the rotating shaft formed by processing in the M case, but in order to avoid a fall amount during assembly of the counter shaft and interference after assembly completion of the counter shaft, high processing accuracy becomes required, and an increase in assembly man-hours and increasingly high costs become a problem.

The present invention was made to solve the above-mentioned problems, and has an object of providing an output shaft support structure and an output shaft assembly method where, by a simple configuration, there ceases to be contact between the rotating shaft and the supporting body of the output shaft, and concern about occurrence of contamination, and so on, can also be dispelled.

A first aspect of the present invention is an output shaft support structure comprising: an output shaft; and a supporting body configured to support the output shaft, wherein the output shaft includes: a rotating shaft; a first rolling bearing fixed to a tip section of the rotating shaft; a second rolling bearing fixed to a rear end section of the rotating shaft; and a gear including a boss section fixed to the rotating shaft, and wherein, the boss section of the gear contacts the second rolling bearing, and a lower end of the rotating shaft is always separated from the supporting body.

A second aspect of the present invention is an output shaft assembly method for assembling, in a supporting body, an output shaft that includes: a rotating shaft; a first rolling bearing fixed to a tip section of the rotating shaft; a second rolling bearing fixed to a rear end section of the rotating shaft; and a gear including a boss section fixed to the rotating shaft, the output shaft assembly method comprising: contacting the boss section of the gear of the output shaft with an inner race of the second rolling bearing in an assembly process; and always separating a lower end of the rotating shaft from the supporting body after assembly.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is table 1 showing evaluation results of working example 1 and working example 2;

FIG. 7 is a graph showing evaluation results of working example 1 and working example 2; and FIG. 8 is a flowchart showing an output shaft assembly method according to the present embodiment.

DESCRIPTION OF THE PREFERRED EMBODIMENTS

Embodiment examples of an output shaft support structure and an output shaft assembly method according to the present invention will be described below with reference to the drawings.

Figure 1:
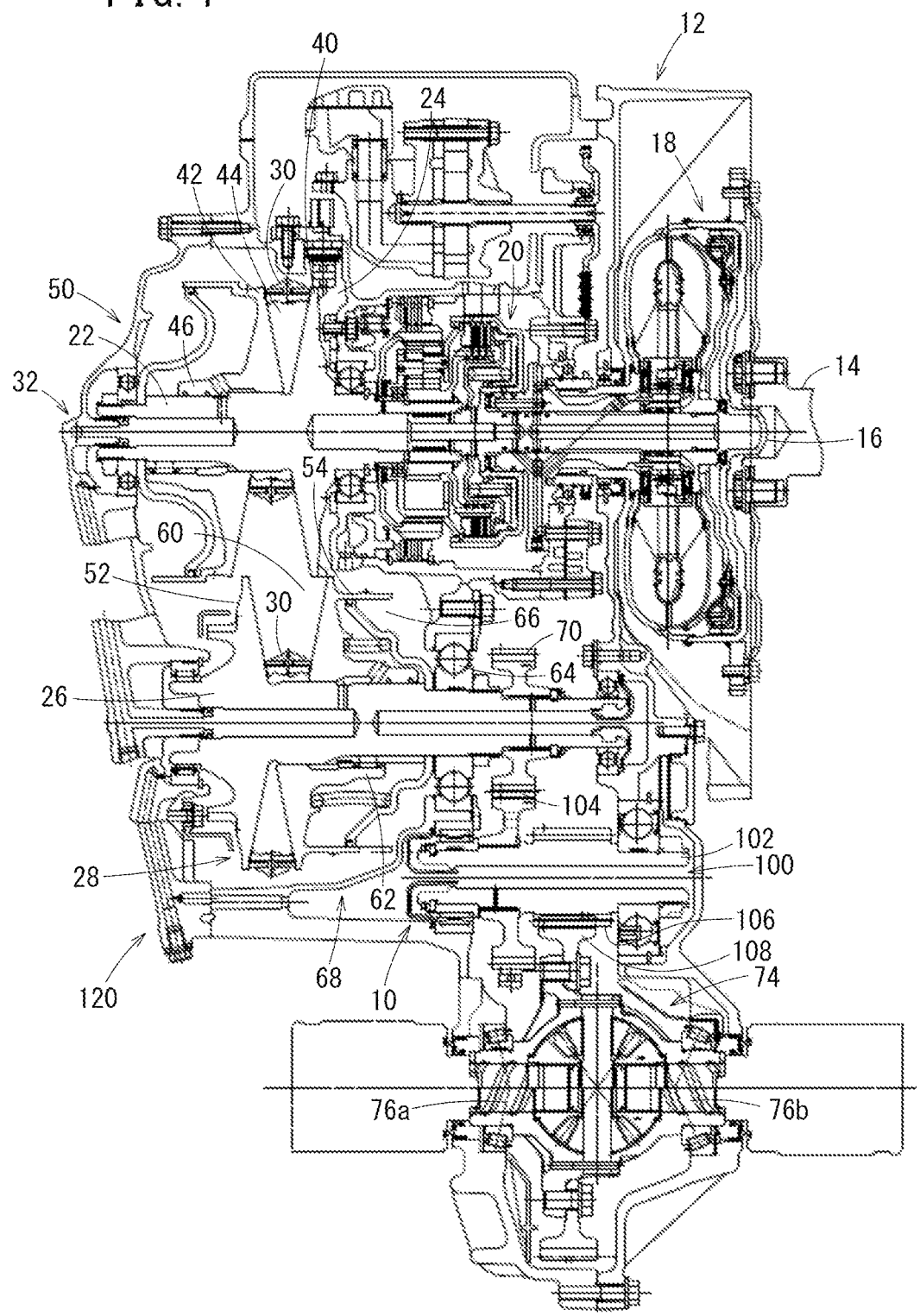
FIG. 1 is a configuration diagram showing an automatic transmission to which an output shaft support structure according to the present embodiment is applied.

First, an automatic transmission, for example, an automatic transmission having a belt-type continuously variable transmission (CVT) mechanism comprising a pulley structure (hereafter, written simply as a "continuously variable transmission 12") to which an output shaft support structure 10 according to the present embodiment is applied, will be described with reference to FIG. 1.

This continuously variable transmission 12 comprises an input shaft 16 to which a driving force of an unillustrated engine is transmitted via a crankshaft 14.

The input shaft 16 has a torque converter 18 installed thereon, and on a downstream side (an output side) of the torque converter 18, there is installed a forward/backward progress switching mechanism 20 configured by a planetary gear mechanism and a clutch and break mechanism. Further to the downstream side of the forward/backward progress switching mechanism 20, there is installed a belt-type continuously variable transmission mechanism 32 comprising a primary pulley 24, a secondary pulley 28, and a V-belt 30 (an endless transmission belt). The primary pulley 24 is provided on a drive shaft 22 being a rotating shaft disposed coaxially with the input shaft 16. The secondary pulley 28 is provided on a driven shaft 26 being a rotating shaft installed parallel to the drive shaft 22 at a predetermined interval from the drive shaft 22. The V-belt 30 is an endless belt wound between these pair of the primary pulley 24 and the secondary pulley 28.

The primary pulley 24 of the belt-type continuously variable transmission mechanism 32 is configured by a fixed-side pulley half body 40 and a movable-side pulley half body 42. A gripping groove 44 for gripping the V-belt 30 is formed between the fixed-side pulley half body 40 and the movable-side pulley half body 42. The fixed-side pulley half body 40 is integrally fixed to the drive shaft 22. The movable-side pulley half body 42 includes a flange section 46 of cylindrical shape that extends to an opposite side to the fixed-side pulley half body 40 along an axial direction. The flange section 46 is spline-fitted (roller spline-fitted) to the drive shaft 22. As a result, the movable-side pulley half body 42 is attached in such a manner that it is incapable of relative rotation, but is capable of movement in the axial direction, on the drive shaft 22. The movable-side pulley half body 42 is configured capable of being driven by a hydraulic actuator mechanism 50. Note that although in the present embodiment, the hydraulic actuator mechanism 50 is exemplified by a single piston-type mechanism, it is not limited to this.

The secondary pulley 28 is configured by a fixed-side pulley half body 52 and a movable-side pulley half body 54. A gripping groove 60 for gripping the V-belt 30 is formed between the fixed-side pulley half body 52 and the movable-side pulley half body 54. The fixed-side pulley half body 52 is integrally fixed to the driven shaft 26. On the other hand, the movable-side pulley half body 54 includes a flange section 62 of cylindrical shape that extends to an opposite side to the fixed-side pulley half body 52 along an axial direction. The flange section 62 is spline-fitted to the driven shaft 26 via a roller member 64. As a result, the movable-side pulley half body 54 is attached in such a manner that it is incapable of relative rotation, but is capable of movement in the axial direction, on the driven shaft 26. The movable-side pulley half body 54 is configured capable of being driven by a hydraulic actuator mechanism 68 having a hydraulic chamber 66. Note that although in the present embodiment, the hydraulic actuator mechanism 68 is exemplified by a single piston-type mechanism, it is not limited to this.

Moreover, a drive gear 70 is firmly fixed to an end section of the driven shaft 26. This drive gear 70 is configured so as to drive drive shafts 76a, 76b reaching to unillustrated wheels, via various gears provided to a rotating shaft 102 of an output shaft 100 (a counter shaft) according to the present embodiment. The above-mentioned various gears are a secondary reduction driven gear 104, a final reduction drive gear 106, and a final reduction driven gear 108 of a differential device 74.

Figure 2:
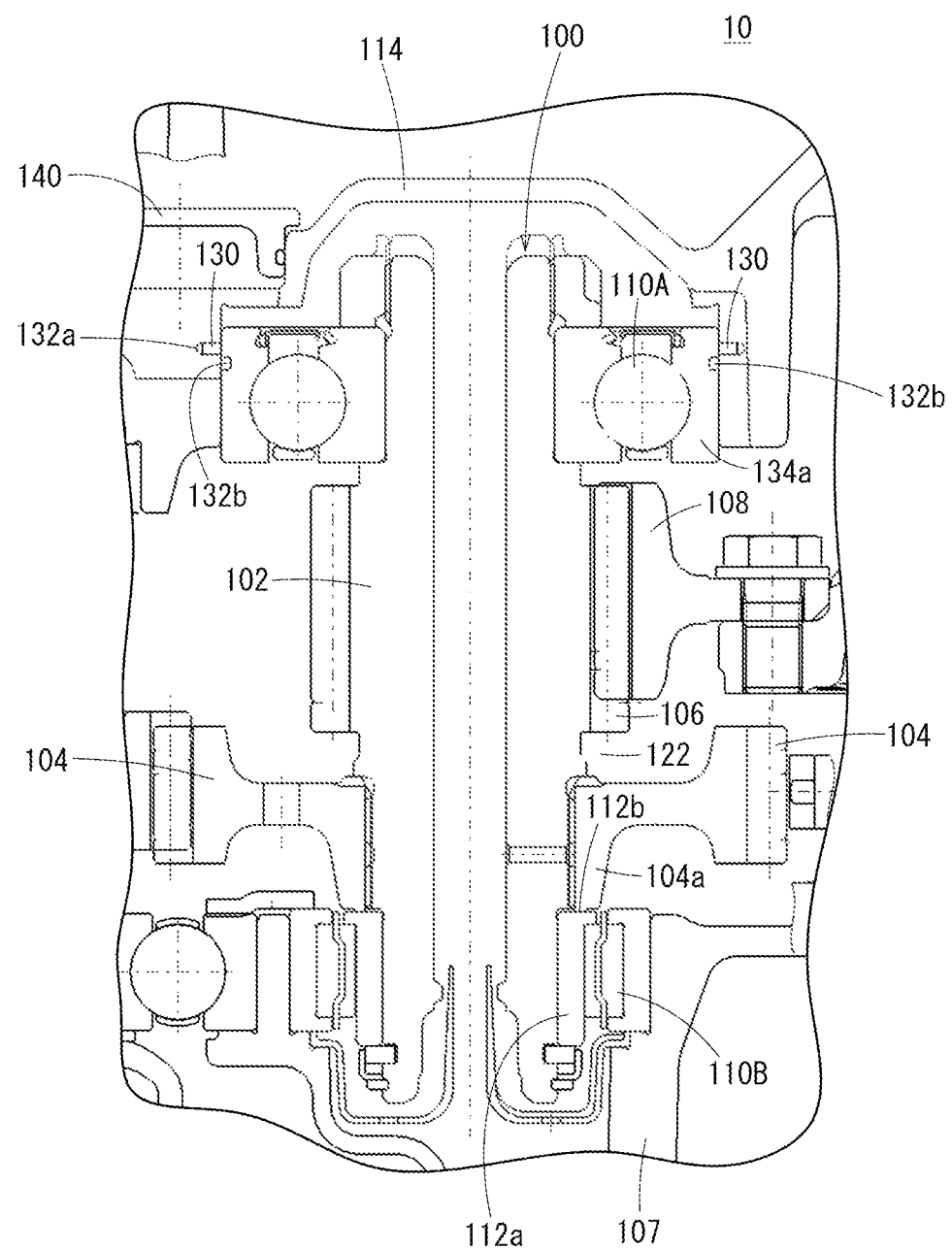
FIG. 2 is a configuration diagram showing the output shaft support structure according to the present embodiment.

Moreover, as shown in FIG. 2, the output shaft support structure 10 according to the present embodiment, that is, a support structure of the output shaft 100 includes the above-mentioned rotating shaft 102, a first rolling bearing 110A, a second rolling bearing 110B, the above-described final reduction drive gear 106, and the above-described secondary reduction driven gear 104. The first rolling bearing 110A is fixed to one end section of the rotating shaft 102. The second rolling bearing 110B is fixed to the other end section of the rotating shaft 102. The final reduction drive gear 106 is formed in substantially a center portion of the rotating shaft 102. The secondary reduction driven gear 104 includes a boss section 104a fixed to a position close to an M-case 107, of the rotating shaft 102. In this support structure 10, over a predetermined period, the boss section 104a of the secondary reduction driven gear 104 contacts an end surface 112b (an end surface opposing a TC-case 114) of an inner race 112a of the second rolling bearing 110B. Moreover, a lower end of the rotating shaft 102 is always separated from an inner wall of the M-case 107 being one of configuring elements of a supporting body 120.

The boss section 104a of the secondary reduction driven gear 104 scarcely projects to the first rolling bearing 110A side and has substantially an L shape (a one-sided flange shape), and an R fillet is provided in a corner thereof on the second rolling bearing 110B side. That is, a gap 122 is formed between the boss section 104a and the final reduction drive gear 106.

Furthermore, the TC-case 114 being another configuring element of the supporting body 120 includes, at a position opposing the rotating shaft 102, a first groove 132a which is annular and in which a circlip 130 is housed. Moreover, an outer race 134a of the first rolling bearing 110A includes a second groove 132b which is annular. Therefore, in an assembly process, when the rotating shaft 102 is raised to a predetermined position, the second groove 132b of the first rolling bearing 110A is positioned in a position opposing the first groove 132a provided in the TC-case 114. As a result, an inner circumferential section of the circlip 130 is locked in the second groove 132b of the first rolling bearing 110A, due to elastic recovery of the circlip 130.

Figure 3:
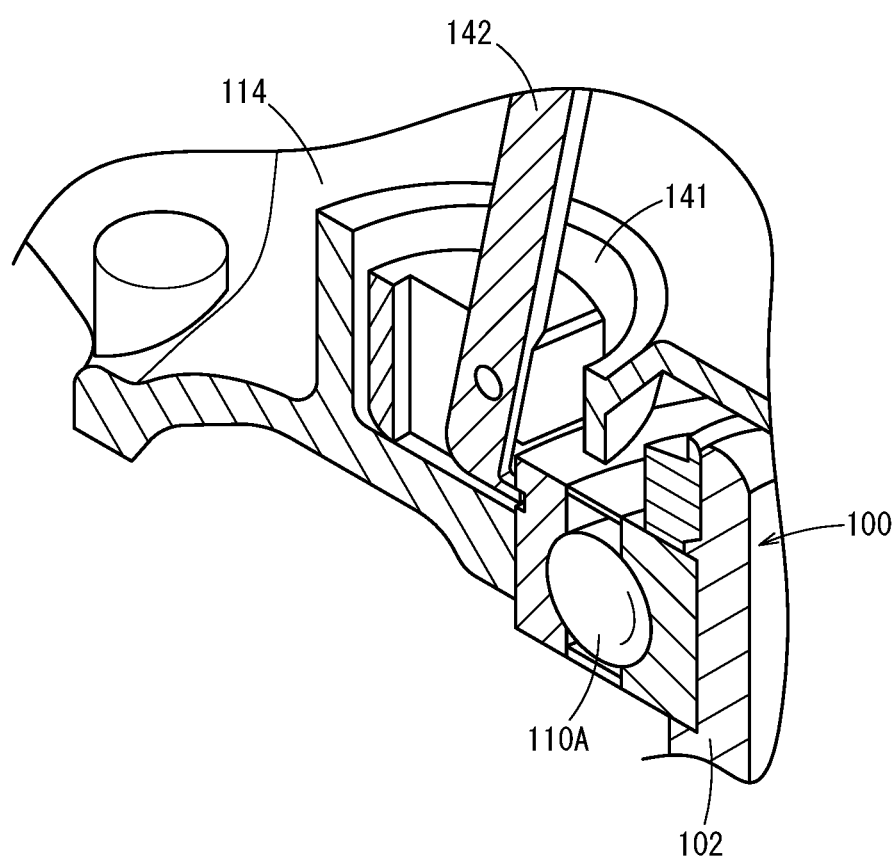
FIG. 3 is a perspective cross-sectional view showing with partial omissions a state of a rotating shaft being raised using a jig.

Note that the following technique, for example, may be adopted for movement of the rotating shaft 102 in one direction. As shown in FIG. 3, a lid 140 (refer to FIG. 2) of the TC-case 114 is removed to expose a maintenance hole 141. Then, for example, part of a jig 142 is caught in the second groove 132b of the first rolling bearing 110A of the rotating shaft 102 to move the rotating shaft 102 in one direction (for example, upwardly).

First Working Example

Now, a working example and a comparative example will be described with reference to FIGS. 2 and 4.

Working Example

As shown in FIG. 2, the working example includes the above-mentioned output shaft support structure 10 according to the present embodiment.

Comparative Example

Figure 4:
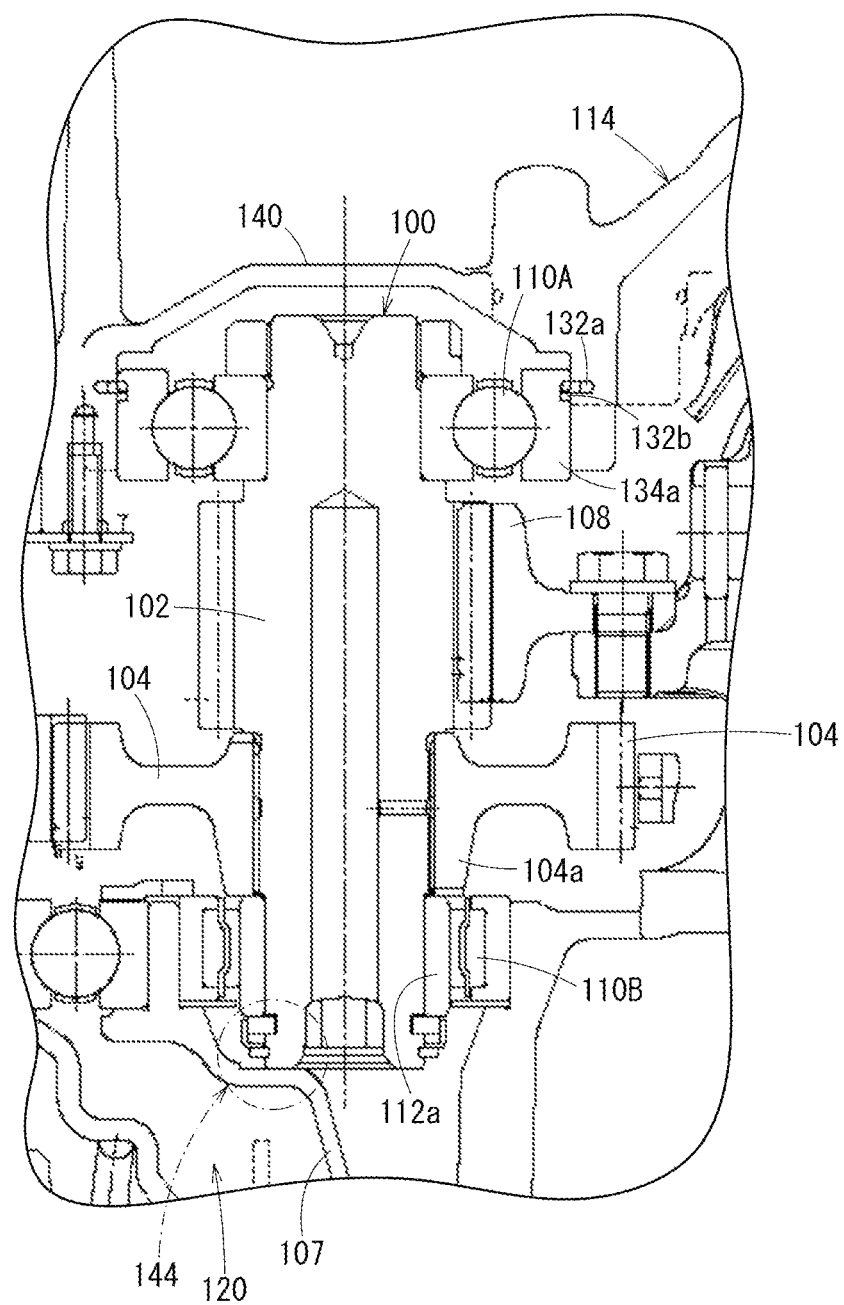
FIG. 4 is configuration diagram showing an output shaft support structure according to a comparative example.

As shown in FIG. 4, the comparative example has a configuration in which the lower end of the rotating shaft 102 is abutted on the supporting body 120 (for example, an inner wall of the M-case 107, or the like) to control fall of the rotating shaft 102. Note that regarding reference symbols, members corresponding to in the working example are for convenience assigned with the same symbols as in the working example.

Evaluation of Comparative Example and Working Example

In a mass production process, dimension measurement for shim adjustment of the differential device 74 is performed. At this time, in order to stabilize a measurement dimension, measurement is implemented rotating in a state where a thrust load has been applied. In the mass production process, there sometimes occurs a need for variable transmissions of different specifications to be assembled in the same facility, and, in the current case, specifications requiring shim adjustment in a support bearing of the rotating shaft 102 are mixed in the same facility. Therefore, for facility sharing, the rotating shaft 102, along with the differential device 74, must be rotated in a state of having been applied with a thrust load. Hence, in the comparative example (refer to FIG. 4), if hardness of a contact portion between the rotating shaft 102 and the supporting body 120 is low, it is easy for damage to occur, and there is concern about occurrence of contamination, and so on. Moreover, if variation in abutting position is large among products, the position of the annular second groove 132b formed in the outer race 134a of the first rolling bearing 110A will vary. In this case, there is also a risk that when the lid 140 is opened after placing the TC-case 114, the second groove 132b is not exposed, and it becomes impossible for raising work of the rotating shaft 102 to be performed. Therefore, high accuracy processing becomes required in terms of bulk density for an abutting portion 144, so there is a problem also regarding costs.

In contrast, the working example (refer to FIG. 2) adopts a structure by which the boss section 104a of the secondary reduction driven gear 104 is contacted with the second rolling bearing 110B for a predetermined period, for example, a period during which dimension measurement for shim adjustment of the differential device 74 is performed. Therefore, it becomes possible for fall of the rotating shaft 102 to be controlled, and for the lower end of the rotating shaft 102 to be always separated from the supporting body 120. As a result, there ceases to be contact between the rotating shaft 102 and the supporting body 120, and concern about occurrence of contamination, and so on, is also dispelled. Moreover, variation in the position of the annular second groove 132b as in the comparative example, almost never occurs. As a result, shortcomings such as the second groove 132b not being exposed when the lid 140 is opened after placing the TC-case 114, do not occur either.

Second Working Example

Working Example 1

Figure 5A:
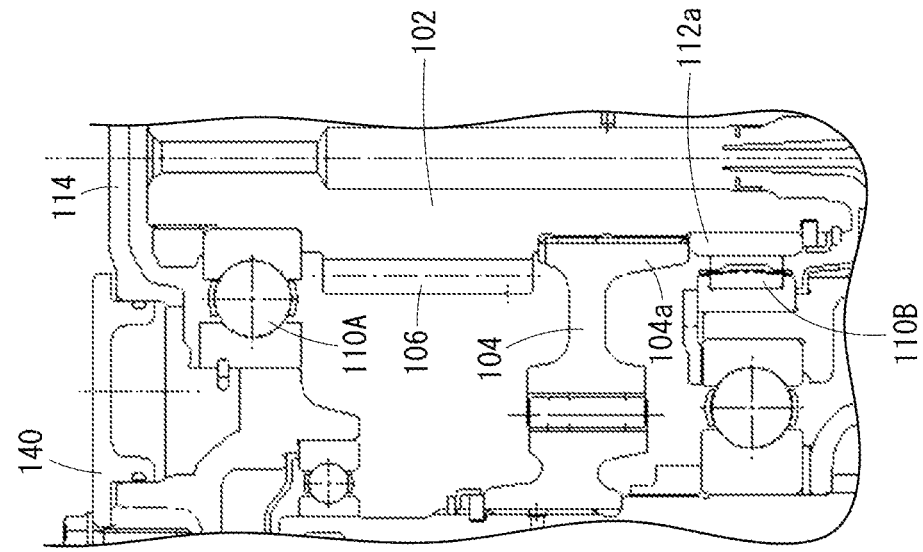
FIG. 5A is a configuration diagram showing an output shaft support structure according to working example 1.

As shown in FIGS. 2 and 5A, working example 1 includes the above-mentioned output shaft support structure 10 according to the present embodiment, and the gap 122 is formed between the boss section 104a of the secondary reduction driven gear 104 and the final reduction drive gear 106.

Working Example 2

Figure 5B:
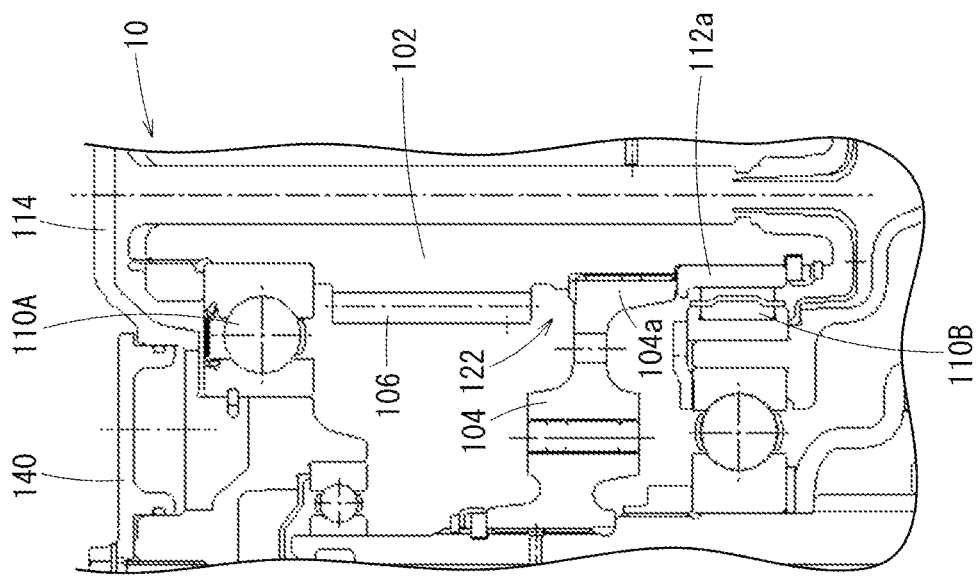
FIG. 5B is a configuration diagram showing an output shaft support structure according to working example 2.

As shown in FIG. 5B, working example 2 has a substantially similar configuration to working example 1, but differs in the following points. The boss section 104a of the secondary reduction driven gear 104 projects also to the final reduction drive gear 106 side. A gap is not formed between the boss section 104a and the final reduction drive gear 106.

Evaluation Method and Evaluation Results of Working Example 1 and Working Example 2

Tensile stress, compressive stress, average stress, and stress amplitude occurring in each of the rotating shafts 102 of working examples 1 and 2 in the case of input torque and foot shaft torque having been made different, were evaluated by FEM analysis. Note that a constituent material of each of the rotating shafts 102 was SCM420H (case hardened steel formed by adding Mo to Cr steel).

Evaluation results are shown in table 1 of FIG. 6. In addition, stress amplitude with respect to average stress is shown in the graph of FIG. 7 along with a fatigue limit line La of SCM420H.

From table 1 of FIG. 6, working example 1 is found to have had a favorable result, with tensile stress, compressive stress, average stress, and stress amplitude being lower than in working example 2. Moreover, from the graph of FIG. 7, working example 1 is found to be effective in stress reduction, with the stress amplitude with respect to average stress being below the fatigue limit line La of SCM420H.

Moreover, as a bonus effect, as shown in working example 1, by configuring the boss section 104a of the secondary reduction driven gear 104 in a one-sided flange shape, a diameter of the rotating shaft 102 can be enlarged, and it becomes possible for the number of spline teeth with the rotating shaft 102 to be increased. Moreover, it becomes possible for a diameter between the final reduction drive gear 106 and the secondary reduction driven gear 104 (a diameter of a portion corresponding to the gap 122) to be increased, without increasing an outer diameter of the rotating shaft 102 overall. That is, working example 1 is found to be a structure more capable of withstanding a high torque load than working example 2.

[Output Shaft Assembly Method]

Next, the output shaft assembly method according to the present embodiment will be described with reference to the flowchart of FIG. 8.

First, in step S1 of FIG. 8, the output shaft 100, and so on, is disposed in the M-case 107.

Then, in step S2, the boss section 104a of the secondary reduction driven gear 104 of the output shaft 100 is contacted with the inner race 112a of the second rolling bearing 110B.

In step S3, for a predetermined period, dimension measurement for shim adjustment of the differential device 74 is performed. At this time, the boss section 104*a* of the secondary reduction driven gear 104 of the output shaft 100 is in a state of having been contacted with the inner race 112*a* of the second rolling bearing 110B, and the lower end of the rotating shaft 102 is in a state of being separated from the supporting body 120.

After the above-described dimension measurement has ended, the M-case 107 is covered by the TC-case 114 while the circlip 130 is expanded, from the maintenance hole 141 (refer to FIG. 3) of the TC-case 114 in step S4.

In step S5, part of the jig 142 is caught in the second groove 132*b* of the first rolling bearing 110A of the rotating shaft 102 to raise the rotating shaft 102 upwardly. At this time, when the rotating shaft 102 has been raised to a predetermined position, the second groove 132*b* of the first rolling bearing 110A is positioned in a position opposing the first groove 132*a* provided in the TC-case 114. Hence, due to elastic recovery of the circlip 130, the inner circumferential section of the circlip 130 is locked in the second groove 132*b* of the first rolling bearing 110A, and the rotating shaft 102 is supported in a freely rotating manner in the TC-case 114.

Then, in step S6, the maintenance hole 141 of the TC-case 114 is covered with the lid 140, whereby work ends.

The above-described embodiment may be summarized as follows.

[1] The output shaft support structure 10 according to the present embodiment includes: the output shaft 100; and the supporting body 120 that supports the output shaft 100, wherein the output shaft 100 includes: the rotating shaft 102; the first rolling bearing 110A fixed to one end section of the rotating shaft 102; the second rolling bearing 110B fixed to the other end section of the rotating shaft 102; and the secondary reduction driven gear 104 including the boss section 104*a* fixed to the rotating shaft 102, and wherein, the boss section 104*a* of the secondary reduction driven gear 104 contacts the second rolling bearing 110B, and the lower end of the rotating shaft 102 is always separated from the supporting body 120.

Conventionally, a thrust position of the output shaft 100 (the counter shaft) has not been determined until the TC-case 114 is assembled in the M-case 107, and there has been a need for the rotating shaft 102 to be contacted with somewhere to prevent fall of the rotating shaft 102. Accordingly, it is conceivable for the lower end of the rotating shaft 102 to be abutted on the supporting body 120 (for example, the inner wall of the M-case 107, or the like) to control fall of the rotating shaft 102. In the mass production process, in that state, dimension measurement for shim adjustment of the differential device 74 is performed. At this time, the rotating shaft 102, along with the differential device 74, is rotated in a state of having been applied with a thrust load. Hence, if hardness of a contact portion between the rotating shaft 102 and the supporting body 120 is low, it is easy for damage to occur, and there is concern about occurrence of contamination, and so on.

Accordingly, by adopting a structure by which the boss section 104*a* of the secondary reduction driven gear 104 is contacted with the second rolling bearing 110B for a predetermined period, for example, a period during which dimension measurement for shim adjustment of the differential device 74 is performed, it becomes possible for fall of the rotating shaft 102 to be controlled, and for the lower end of the rotating shaft 102 to be always separated from the supporting body 120. As a result, there ceases to be contact between the rotating shaft 102 and the supporting body 120, and concern about occurrence of contamination, and so on, is also dispelled.

[2] In the output shaft support structure 10, the boss section 104*a* of the secondary reduction driven gear 104 projects only to the second rolling bearing 110B.

Hence, a diameter of a portion to which the secondary reduction driven gear 104 is fixed, of the diameter of the rotating shaft 102 is enlarged, and proportionately, the number of teeth for fixing the boss section 104*a* of the secondary reduction driven gear 104 can be increased, and, moreover, a length in the axial direction of the boss section 104*a* can be shortened. As a result, the boss section 104*a* can be configured substantially in an L shape, and it becomes possible to expand R of the corner to provide strength. The gap 122 can be provided between the boss section 104*a* and another gear (for example, the final reduction drive gear 106), and concentration points of lateral load can be dispersed. It naturally becomes possible too to locally thicken a portion between the boss section 104*a* and the other gear (for example, the final reduction drive gear 106), without thickening the rotating shaft 102 overall. This leads to an increase in strength of the rotating shaft 102.

[3] In the output shaft support structure 10, the supporting body 120 includes, at a position opposing the rotating shaft 102, the first groove 132*a* which is annular and in which the circlip 130 is housed, and the outer race 134*a* of the first rolling bearing 110A includes the second groove 132*b* which is annular and in which an inner ring section of the circlip 130 is locked.

By the rotating shaft 102 being moved in one direction so that the first groove 132*a* of the supporting body 120 and the second groove 132*b* of the first rolling bearing 110A are opposed, an inner circumferential section of the circlip 130 is locked in the second groove 132*b* of the first rolling bearing 110A, thereby making it possible for the rotating shaft 102 to be fixedly positioned in a freely rotating manner in the supporting body 120. For movement of the rotating shaft 102 in one direction, there may be adopted a method of moving in one direction by catching part of the jig 142 in the second groove 132*b* of the rotating shaft 102, for example.

[4] In the output shaft support structure 10, before the inner ring section of the circlip 130 is locked in the second groove 132*b* of the first rolling bearing 110A, the boss section 104*a* of the secondary reduction driven gear 104 contacts the end surface 112*b* of the inner race 112*a* of the second rolling bearing 110B. Before the inner ring section of the circlip 130 is locked in the second groove 132*b* of the first rolling bearing 110A, the rotating shaft 102 is not fixed to the supporting body 120, hence the rotating shaft 102 moves downwardly. However, the boss section 104*a* of the secondary reduction driven gear 104 contacts the inner race 112*a* of the second rolling bearing 110B, whereby further movement downwards is hindered, and fall of the rotating shaft 102 is controlled.

Therefore, as mentioned above, there ceases to be contact between the rotating shaft 102 and the supporting body 120, and concern about occurrence of contamination, and so on, is also dispelled.

[5] The output shaft assembly method according to the present embodiment is an assembly method of the output shaft 100 for assembling, in the supporting body 120, the output shaft 100 that includes: the rotating shaft 102; the first rolling bearing 110A fixed to one end section of the rotating shaft 102; the second rolling bearing 110B fixed to the other end section of the rotating shaft 102; and the secondary reduction driven gear 104 including the boss section 104a fixed to the rotating shaft 102, the output shaft assembly method including: contacting the boss section 104a of the secondary reduction driven gear 104 of the output shaft 100 with the end surface 112b of the inner race 112a of the second rolling bearing 110B in an assembly process; and always separating a lower end of the rotating shaft 102 the supporting body 120 after assembly.

For a predetermined period, for example, a period during which dimension measurement for shim adjustment of the differential device 74 is performed, the boss section 104a of the secondary reduction driven gear 104 is contacted with the inner race 112a of the second rolling bearing 110B, thereby making it possible for fall of the rotating shaft 102 to be controlled, and for the lower end of the rotating shaft 102 to be always separated from the supporting body 120. As a result, there ceases to be contact between the rotating shaft 102 and the supporting body 120, and concern about occurrence of contamination, and so on, is also dispelled. Hence, an improvement in quality and an improvement in production efficiency can be achieved.

[6] In the output shaft assembly method, the supporting body 120 includes, at a position opposing the rotating shaft 102, the first groove 132a which is annular and in which the circlip 130 is housed, the outer race 134a of the first rolling bearing 110A includes the second groove 132b which is annular and in which the inner ring section of the circlip 130 is locked, the assembly process is before the inner ring section of the circlip 130 is locked in the second groove 132b of the first rolling bearing 110A, and after the assembly, the inner ring section of the circlip 130 has been locked in the second groove 132b of the first rolling bearing 110A.

In the assembly process, the inner ring section of the circlip 130 is not locked in the second groove 132b of the first rolling bearing 110A, and the rotating shaft 102 is not fixed to the supporting body 120, hence the rotating shaft 102 moves downwardly. However, the boss section 104a of the secondary reduction driven gear 104 contacts the end surface 112b of the inner race 112a of the second rolling bearing 110B, whereby further movement downwards is hindered, and fall of the rotating shaft 102 is controlled. Subsequently, the rotating shaft 102 is moved in one direction so that the first groove 132a of the supporting body 120 and the second groove 132b of the first rolling bearing 110A are opposed, whereby there is achieved a state where, after assembly, the inner circumferential section of the circlip 130 is locked in the second groove 132b of the first rolling bearing 110A, hence a lower end of the rotating shaft 102 is always separated from the supporting body 120, and the rotating shaft 102 is fixed in a freely rotating manner to the supporting body 120.

[7] In the output shaft assembly method, over a period from the assembly process to after the assembly, the lower end of the rotating shaft 102 is always separated from the supporting body 120.

As a result, there ceases to be contact between the rotating shaft 102 and the supporting body 120, concern about occurrence of contamination, and so on, is also dispelled, and an improvement in quality and an improvement in production efficiency can be achieved.

Note that the present invention is not limited to the above-mentioned embodiment and may of course be freely changed in a range not departing from the spirit of the present invention.

What is claimed is:

1. An output shaft support structure comprising:
   an output shaft; and
   a supporting body configured to support the output shaft, wherein the output shaft includes:
   a rotating shaft;
   a first rolling bearing fixed to one end section of the rotating shaft;
   a second rolling bearing fixed to another end section of the rotating shaft; and
   a gear including a boss section fixed to the rotating shaft, wherein
   the boss section of the gear contacts the second rolling bearing, and a lower end of the rotating shaft is always separated from the supporting body,
   the boss section of the gear projects only to the second rolling bearing,
   the supporting body includes, at a position opposing the rotating shaft, a first groove which is annular and in which a circlip is housed, and
   an outer race of the first rolling bearing includes a second groove which is annular and in which an inner ring section of the circlip is locked.

2. The output shaft support structure according to claim 1, wherein before the inner ring section of the circlip is locked in the second groove of the first rolling bearing, the boss section of the gear contacts an inner race of the second rolling bearing.

3. An output shaft support structure comprising:
   an output shaft; and
   a supporting body configured to support the output shaft, wherein the output shaft includes:
   a rotating shaft;
   a first rolling bearing fixed to one end section of the rotating shaft;
   a second rolling bearing fixed to another end section of the rotating shaft; and
   a gear including a boss section fixed to the rotating shaft, wherein the boss section of the gear contacts the second rolling bearing, and a lower end of the rotating shaft is always separated from the supporting body, wherein
   the supporting body includes, at a position opposing the rotating shaft, a first groove which is annular and in which a circlip is housed, and
   an outer race of the first rolling bearing includes a second groove which is annular and in which an inner ring section of the circlip is locked.

4. The output shaft support structure according to claim 3, wherein
   before the inner ring section of the circlip is locked in the second groove of the first rolling bearing, the boss section of the gear contacts an inner race of the second rolling bearing.

\* \* \* \* \*